United States Patent
Saika

(10) Patent No.: US 8,392,568 B2
(45) Date of Patent: Mar. 5, 2013

(54) COMPUTER SYSTEM AND METHOD OF MANAGING SINGLE NAME SPACE

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 211 days.

(21) Appl. No.: 12/577,593

(22) Filed: Oct. 12, 2009

(65) Prior Publication Data

US 2011/0029648 A1  Feb. 3, 2011

(30) Foreign Application Priority Data

Jul. 30, 2009  (JP) ................................ 2009-177248

(51) Int. Cl.
*G06F 15/173* (2006.01)

(52) U.S. Cl. ...................................................... 709/226

(58) Field of Classification Search ........... 709/223–225
See application file for complete search history.

(56) References Cited

U.S. PATENT DOCUMENTS

| 6,996,601 | B1 * | 2/2006 | Smith ............................ 709/203 |
| 7,765,217 | B2 * | 7/2010 | Yamakawa et al. ........... 707/751 |
| 2004/0054893 | A1 * | 3/2004 | Ellis .............................. 713/165 |
| 2007/0006015 | A1 * | 1/2007 | Rao et al. ........................ 714/4 |
| 2008/0235350 | A1 | 9/2008 | Nakamura et al. |
| 2009/0043797 | A1 * | 2/2009 | Dorie et al. ................... 707/101 |

FOREIGN PATENT DOCUMENTS

JP     2008-234568      10/2008

* cited by examiner

*Primary Examiner* — Scott Christensen

(74) *Attorney, Agent, or Firm* — Foley & Lardner LLP

(57) ABSTRACT

Proposed are a computer system and a method of configuring a single name space capable of simplifying the management of a GNS and alleviating the burden of an administrator. A management apparatus collects, from each node, management information and an access log of each of the files managed by the relevant node, extracts a user who satisfies a prescribed condition as a key person for each of the nodes based on the collected management information and access log of each of the files, specifies the key person who is common to the plurality of nodes among the extracted key persons, and requests a server to integrate, as a single name space, the plurality of nodes in which the number of common key persons exceeds a predetermined first threshold. The server integrates, as a single name space, the plurality of nodes in which the number of common key persons exceeds a predetermined first threshold in response to the request.

6 Claims, 16 Drawing Sheets

FIG.3

ACCESS LOG

| DATE AND TIME | DIRECTORY PATH NAME | OPERATION |
|---|---|---|
| 2009/5/14 10:15:00 | /File-1.txt | read |
| 2009/5/14 11:12:23 | /Holder-1/File-3.txt | write |
| ⋮ | ⋮ | ⋮ |
| 2009/5/15 23:12:23 | /Holder-2/File-5.txt | write |
| ⋮ | ⋮ | ⋮ |

| DIRECTORY PATH NAME | iNODE NUMBER |
|---|---|
| /home/user-01/・・・/a.txt | 100 |
| /home/user-02/・・・/b.txt | 200 |
| : | : |

61A  61B  61

<SUPPLEMENTAL EXPLANATION>
ABBREVIATIONS: U →USER, G →GROUP, O →OTHER (EXCLUDING USER)
ABBREVIATIONS: R →READ, X →EXECUTE, W →WRITE

FIG.9

| DIRECTORY PATH NAME | HOST NAME | FILE SYSTEM NAME | iNODE NUMBER |
|---|---|---|---|
| /b.txt | NAS-1 | FS11 | 200 |
| /Holder-1/d.txt | NAS-2 | FS21 | 501 |
| /Holder-2/a.txt | NAS-3 | FS31 | 1000 |
| /Holder-1/Holder-11/c.txt | NAS-3 | FS32 | 1001 |
| 64A | 64B | 64C | 64D |

FILE INFORMATION MANAGEMENT TABLE

| NO. | NAS NAME | USER NAME | DIRECTORY PATH NAME | NUMBER OF CITATIONS FROM OTHER DOCUMENTS | REFERRAL COUNT |
|---|---|---|---|---|---|
| 1 | NAS-1 | user-11 | /Holder1/a.txt | 10 | 50 |
| 2 | NAS-1 | user-12 | /Holder1/a9.txt | 5 | 9 |
| 3 | NAS-1 | user-13 | /Holder1/a10.txt | 5 | 8 |
| 4 | NAS-1 | user-14 | /Holder1/a11.txt | 5 | 6 |
| 5 | NAS-1 | user-15 | /Holder1/a12.txt | 5 | 6 |
| 6 | NAS-1 | user-16 | /Holder1/a13.txt | 5 | 6 |
| 7 | NAS-1 | user-17 | /Holder1/a14.txt | 5 | 6 |
| 8 | NAS-1 | user-31 | /Holder3/c6.txt | 40 | 70 |
| : | : | : | : | : | : |
| 11 | NAS-2 | user-11 | /Holder1/a3.txt | 11 | 50 |
| 12 | NAS-2 | user-21 | /Holder2/b.txt | 30 | 80 |
| 13 | NAS-2 | user-22 | /Holder3/c1.txt | 40 | 70 |
| 14 | NAS-2 | user-23 | /Holder3/c2.txt | 10 | 21 |
| 15 | NAS-2 | user-24 | /Holder3/c6.txt | 5 | 7 |
| 16 | NAS-2 | user-25 | /Holder3/c8.txt | 5 | 3 |
| 17 | NAS-2 | user-26 | /Holder3/c9.txt | 5 | 3 |
| 18 | NAS-2 | user-27 | /Holder3/c10.txt | 5 | 3 |
| 19 | NAS-2 | user-28 | /Holder3/c11.txt | 5 | 3 |
| 20 | NAS-2 | user-29 | /Holder3/c12.txt | 5 | 3 |
| 21 | NAS-2 | user-31 | /Holder3/c3.txt | 50 | 100 |
| 22 | NAS-3 | user-32 | /Holder3/c5.txt | 45 | 72 |
| : | : | : | : | : | : |
| 25 | NAS-3 | user-11 | /Holder1/a2.txt | 13 | 54 |
| 26 | NAS-3 | user-31 | /Holder3/c4txt | 40 | 70 |
| 27 | NAS-3 | user-32 | /Holder3/d5.txt | 45 | 72 |
| 28 | NAS-3 | user-33 | /Holder3/d6.txt | 4 | 7 |
| 29 | NAS-3 | user-34 | /Holder3/d7.txt | 3 | 7 |
| 30 | NAS-3 | user-21 | /Holder2/d.txt | 35 | 85 |
| 31 | NAS-3 | user-22 | /Holder3/c7.txt | 40 | 70 |
| 32 | NAS-3 | user-23 | /Holder3/d2.txt | 5 | 20 |
| : | : | : | : | : | : |

KEY PERSON MANAGEMENT TABLE

| | NAS-1 | NAS-2 | NAS-3 |
|---|---|---|---|
| NAS-1 | — | <KEY PERSON><br>user-1<br><NUMBER OF KEY PERSONS><br>1 | <KEY PERSON><br>user-11<br>user-31<br><NUMBER OF KEY PERSONS><br>2 |
| NAS-2 | — | — | <KEY PERSON><br>user-21<br>user-22<br>user-23<br>user-31<br>user-32<br><NUMBER OF KEY PERSONS><br>5 |

FILE INFORMATION MANAGEMENT TABLE

| NO. | NAS NAME | USER NAME | DIRECTORY PATH NAME | NUMBER OF CITATIONS FROM OTHER DOCUMENTS | REFERRAL COUNT |
|---|---|---|---|---|---|
| 1 | NAS-1 | user-11 | /Holder1/a.txt | 10 | 50 |
| 2 | NAS-1 | user-12 | /Holder1/a9.txt | 5 | 9 |
| 3 | NAS-1 | user-13 | /Holder1/a10.txt | 5 | 8 |
| 4 | NAS-1 | user-14 | /Holder1/a11.txt | 5 | 6 |
| 5 | NAS-1 | user-15 | /Holder1/a12.txt | 5 | 6 |
| 6 | NAS-1 | user-16 | /Holder1/a13.txt | 5 | 6 |
| 7 | NAS-1 | user-17 | /Holder1/a14.txt | 5 | 6 |
| 8 | NAS-1 | user-31 | /Holder3/c6.txt | 40 | 70 |
| : | : | : | : | : | : |
| 11 | NAS-2 | user-11 | /Holder1/a3.txt | 11 | 50 |
| 12 | NAS-2 | user-21 | /Holder2/b.txt | 30 | 80 |
| 13 | NAS-2 | user-22 | /Holder3/c1.txt | 40 | 70 |
| 14 | NAS-2 | user-23 | /Holder3/c2.txt | 10 | 21 |
| 15 | NAS-2 | user-24 | /Holder3/c6.txt | 5 | 7 |
| 16 | NAS-2 | user-25 | /Holder3/c8.txt | 5 | 3 |
| 17 | NAS-2 | user-26 | /Holder3/c9.txt | 5 | 3 |
| 18 | NAS-2 | user-27 | /Holder3/c10.txt | 5 | 3 |
| 19 | NAS-2 | user-28 | /Holder3/c11.txt | 5 | 3 |
| 20 | NAS-2 | user-29 | /Holder3/c12.txt | 5 | 3 |
| 21 | NAS-2 | user-31 | /Holder3/c3.txt | 50 | 100 |
| 22 | NAS-3 | user-32 | /Holder3/c5.txt | 45 | 72 |
| : | : | : | : | : | : |
| 25 | NAS-3 | user-11 | /Holder1/a2.txt | 13 | 54 |
| 26 | NAS-3 | user-31 | /Holder3/c4.txt | 40 | 70 |
| 27 | NAS-3 | user-32 | /Holder3/d5.txt | 45 | 72 |
| 28 | NAS-3 | user-33 | /Holder3/d6.txt | 4 | 7 |
| 29 | NAS-3 | user-34 | /Holder3/d7.txt | 3 | 7 |
| 30 | NAS-3 | user-21 | /Holder2/d.txt | 35 | 85 |
| 31 | NAS-3 | user-22 | /Holder3/c7.txt | 40 | 70 |
| 32 | NAS-3 | user-23 | /Holder3/d2.txt | 5 | 20 |
| : | : | : | : | : | : |

82A 82B 82C 82D 82E 82F

82

COMPUTER SYSTEM AND METHOD OF MANAGING SINGLE NAME SPACE

CROSS REFERENCES

This application relates to and claims priority from Japanese Patent Application No. 2009-177248, filed on Jul. 30, 2009, the entire disclosure of which is incorporated herein by reference.

BACKGROUND

The present invention relates to a computer system and a method of managing a single name space (GNS: Global Name Space) and, for instance, can be suitably applied to a computer system comprising a plurality of NAS (Network Attached System) servers applying the GNS technology.

Conventionally, technology for unifying file systems distributed to a plurality of NASes for a user by managing such plurality of NASes with a GNS (that is, by making it appear to be a single NAS) has been proposed (refer to Japanese Patent Laid-Open Publication No. 2008-234568; "Patent Document 1").

SUMMARY

Patent Document 1 describes that an administrator is to define the configuration of the GNS and carry out the operation. Nevertheless, if there are a plurality of nodes (NASes), it is difficult to determine which NAS and which NAS should be consolidated in the same GNS. Moreover, if a NAS is to be added to an existing GNS, it is difficult to evaluate the effect that is yielded by such addition.

The present invention was devised in view of the foregoing points. Thus, an object of this invention is to propose a computer system and a method of configuring a single name space capable of simplifying the management of the GNS and alleviating the burden of the administrator.

In order to achieve the foregoing object, the present invention provides a computer system including a storage subsystem for providing a storage area for reading and writing files, a plurality of nodes for providing a file sharing service to a user, a server for unifying the plurality of nodes and providing this as a single name space to a client, and a management apparatus for managing each of the nodes and the server. In this computer system, the management apparatus collects, from each of the nodes, management information and an access log of each of the files managed by the relevant node, extracts a user who satisfies a prescribed condition as a key person for each of the nodes based on the collected management information and access log of each of the files, specifies the key person who is common to the plurality of nodes among the extracted key persons, and requests the server to integrate, as a single name space, the plurality of nodes in which the number of common key persons exceeds a predetermined first threshold. The server integrates, as a single name space, the plurality of nodes in which the number of common key persons exceeds a predetermined first threshold in response to the request.

The present invention additionally provides method of managing a single name space in a computer system. This computer system includes a storage subsystem for providing a storage area for reading and writing files, a plurality of nodes for providing a file sharing service to a user, a server for unifying the plurality of nodes and providing this as a single name space to a client, and a management apparatus for managing each of the nodes and the server. This method includes a first step of the management apparatus collecting, from each of the nodes, management information and an access log of each of the files managed by the relevant node, extracting a user who satisfies a prescribed condition as a key person for each of the nodes based on the collected management information and access log of each of the files, specifying the key person who is common to the plurality of nodes among the extracted key persons, and requesting the server to integrate, as a single name space, the plurality of nodes in which the number of common key persons exceeds a predetermined first threshold, and a second step of the server integrating, as a single name space, the plurality of nodes in which the number of common key persons exceeds a predetermined first threshold in response to the request.

According to the present invention, it is possible to realize a computer system and a method of configuring a single name space capable of simplifying the management of the GNS and alleviating the burden of the administrator.

DESCRIPTION OF DRAWINGS

FIG. 3 is a conceptual diagram explaining an access log;

FIG. 5 is a conceptual diagram showing a configuration example of a directory entry;

FIG. 9 is a conceptual diagram showing the configuration of a GNS management table;

FIG. 11 is a conceptual diagram showing the configuration of a file information management table;

FIG. 12 is a conceptual diagram showing the configuration of a key person management table;

FIG. 13 is a conceptual diagram explaining a key person;

DETAILED DESCRIPTION

An embodiment of the present invention is now explained in detail with reference to the attached drawings.

(1) Configuration of Computer System According to Present Embodiment

Figure 1:
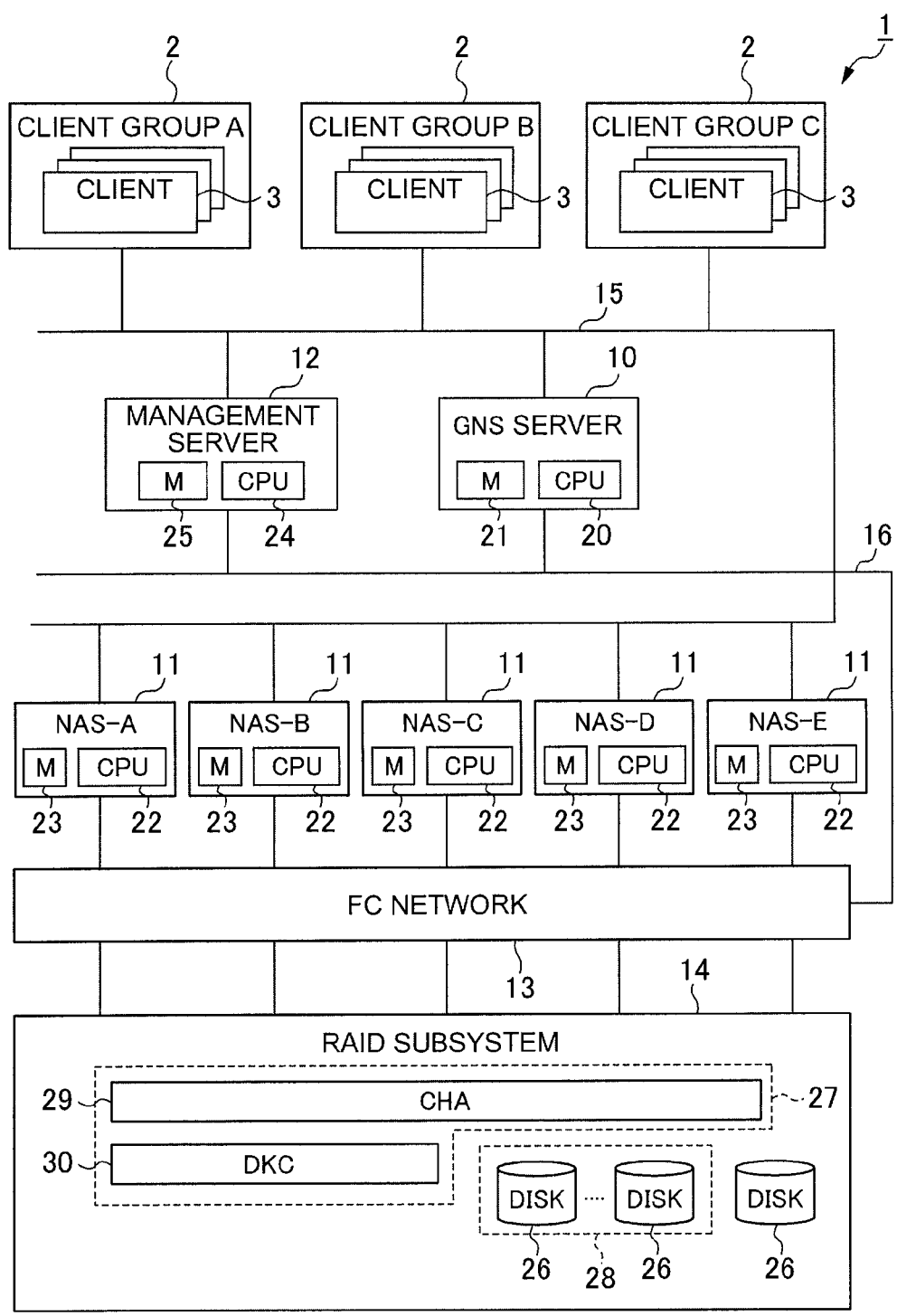
FIG. 1 is a block diagram showing the hardware configuration of a computer system according to the present embodiment.

FIG. 1 shows the overall computer system 1 according to the present embodiment. The computer system 1 is configured from a client group 2, a GNS server 10, a NAS server 11, a management server 12, an FC (Fibre Channel) network 13, and a RAID (Redundant Arrays of Inexpensive Disks) subsystem 14. The respective GNS servers 10, the respective NAS servers 11 and the management server 12 are connected via a first network 15, and the respective GNS servers 10, the management server 12 and the FC network 13 are connected via a second network 16.

The client group 2 is configured from a plurality of clients 3. Each client 3 is a computer device comprising information processing resources such as a CPU (Central Processing Unit), a memory, an NIC (Network Interface Card), and a hard disk device and is configured, for example, from a personal computer, a workstation or a mainframe.

The GNS server 10 is a server for unifying a plurality of NAS servers 11 and showing it as a single name space (GNS) to the client 3, and is configured by comprising information processing resources such as a CPU 20 and a memory 21. The GNS server 10 is connected to the first network 15 via an NIC (not shown), and is able to communicate with the management server 12 and the corresponding client 3 via the first network 15. The GNS server 10 is also connected to the second network 16 via an HBA (Host Bus Adapter) (not shown), and is able to read, during its startup, control programs such as the GNS management program 65 (FIG. 2) described later from the RAID subsystem 14 via the second network 16.

The NAS server 11 is a server for providing a file sharing service to the client 3, and is configured by comprising information processing resources such as a CPU 22 and a memory 23. The NAS server 11 is also connected to the second network 15 via an NIC (not shown) as with the GNS server 10, and is able to communicate with the management server 12 and the GNS server 10 via the second network 15. The NAS server 11 is also connected to the FC network 13 via an HBA (not shown).

The management server 12 is a server to be used by the system administrator for managing the GNS server 10, the NAS server 11, the FC network 13 and the RAID subsystem 14 in the data center 5, and is configured from a personal computer, a workstation or the like. The management server 12 comprises information processing resources such as a CPU 24 and a memory 25, input devices such as a keyboard and a mouse, and output devices such as a display and a speaker. The management server 12 collects necessary information from the GNS server 10, the NAS server 11, the FC network 13 and the RAID subsystem 14 and displays the collected information as necessary, and sends commands to the GNS server 10, the NAS server 11, the FC network 13 and the RAID subsystem 14 in order to control the foregoing components.

The FC network 13 is configured from one or more FC switches. The exchange of data and commands between the GNS server 10, the NAS server 11 or the management server 12 and the RAID subsystem 14 is conducted via the FC network 13.

The RAID subsystem 14 is a storage apparatus that is configured from one or more disk devices 26, and a controller 27 for controlling the input and output of data to and from the disk device 26. Although FIG. 1 illustrates a case of providing only one RAID subsystem 14 in the computer system 1, it is also possible to provide a plurality of RAID subsystems 14.

The disk device 26 is configured from an expensive disk such as a SCSI (Small Computer System Interface) disk, or an inexpensive disk such as a SATA (Serial AT Attachment) disk or an optical disk. One RAID group 28 is configured from one or more disk devices 26, and one or more logical volumes are set in the physical storage areas provided by the respective disk devices 26 that are configuring one RAID group 28. Data from the client is stored in the logical volume as units of a block (this is hereinafter referred to as the "logical block") of a prescribed size.

A unique volume number is assigned to each logical volume. In the case of this embodiment, the input and output of data is performed by using a combination of the volume number and a block number (LBA: Logical Block Address) of that logical block that is assigned to each logical block as the address, and designating that address.

The controller 27 comprises one or more channel adapters (CHA) 29, and one or more disk controllers (DKC) 30. The controller 27 receives, in the channel adapter 29, an I/O (Input/Output) request that is given from the NAS server 11 via the FC network 13, and reads and writes data from and into the corresponding disk device 26 under the control of the disk controller 30 according to the foregoing I/O request.

Figure 2:
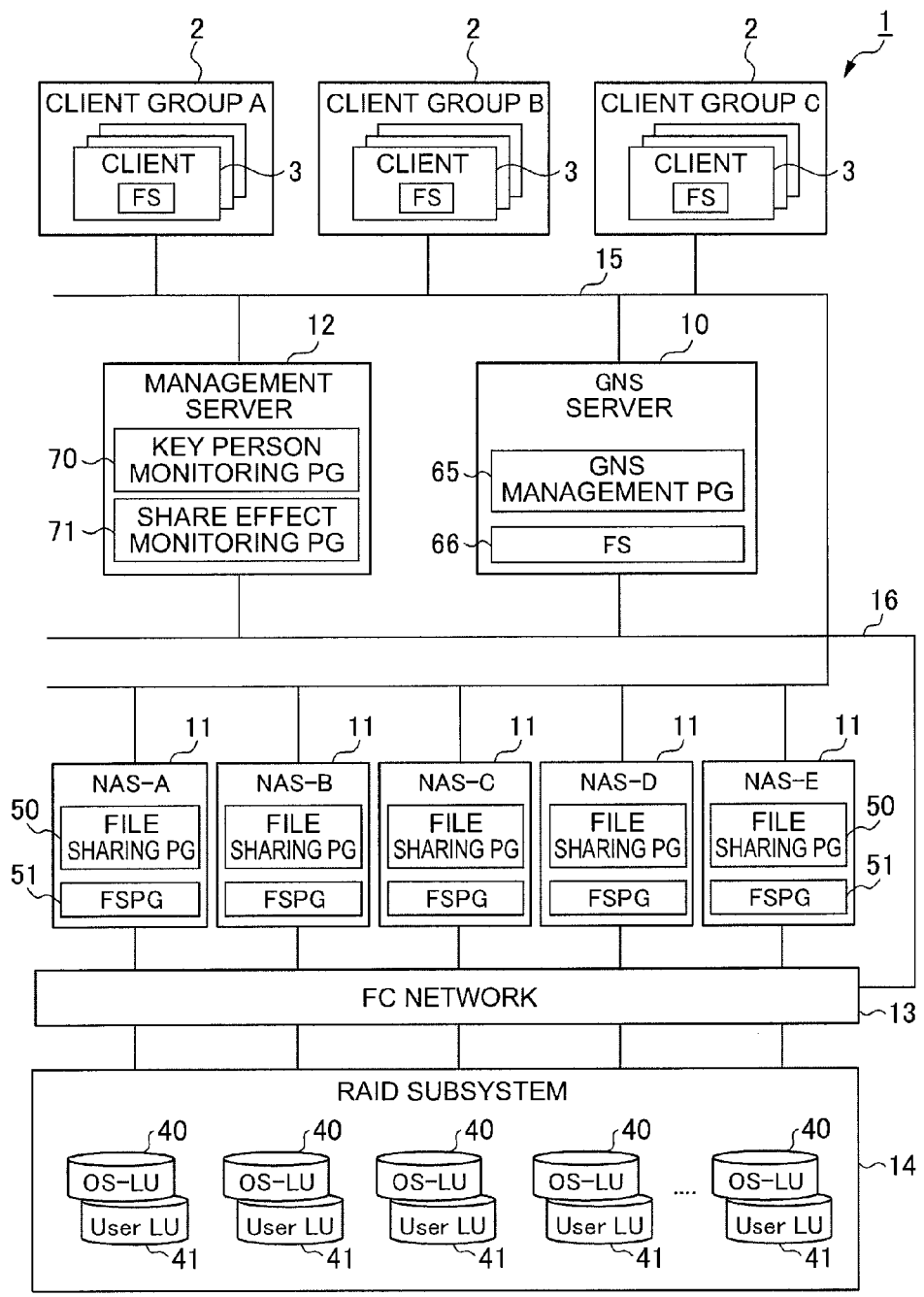
FIG. 2 is a block diagram showing the software configuration of a computer system according to the present embodiment.

FIG. 2 shows the software configuration of the computer system 1. In the computer system 1, a plurality of logical volumes are formed in the RAID group 28 (FIG. 1) of the RAID subsystem 14. Under a NAS environment, two types of logical volumes; namely, an OS volume (OS-LU) 40 and a user volume (User-LU) 41 are created as the foregoing logical volumes.

The OS volume 40 is a logical volume for storing programs to be used by the OS (Operation System) of the GNS server 10 and the NAS server 11. The OS volume 40 also stores the access log 81 shown in FIG. 3. The access log 81 stores the historical data of accesses from the user to the files stored in the RAID subsystem 14, and is configured from a date and time of access, a directory path name, and an operation type (read/write).

The user volume 41 is a logical volume for storing data based on the I/O request from the client 3. The storage area that is provided by the user volume 41 is used by the file system.

The NAS server 11 is loaded with a file sharing program 50 and a file system program 51.

The file system program 51 is a program for managing the file system, which is a logical structure that is created for realizing the management unit referred to as a "file" in the physical volume.

Figure 4:
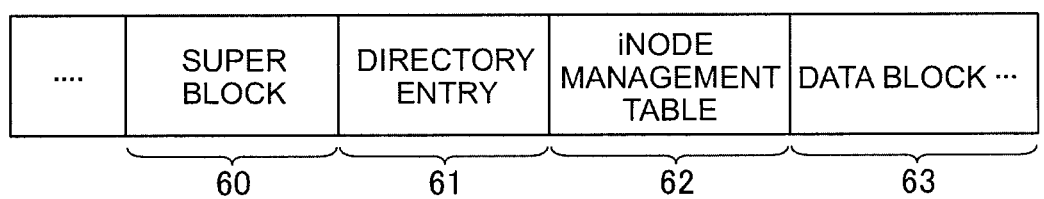
FIG. 4 is a conceptual diagram explaining a file system.

Here, to explain the file system, the file system comprises, as shown in FIG. 4, a super block 60, a directory entry 61, an inode management table 62, and a data block 63. Among the above, the super block 60 is a logical block for collectively retaining information concerning the file system such as the size and unused capacity of the file system.

Moreover, the file system associates one inode with one file and manages such association, and the correspondence relationship is managed in the directory entry 61. Specifically, the directory entry is a table including, as shown in FIG. 5, the pair of a directory path name 61A, and an index (this is hereinafter referred to as the "inode number") 61B designating the inode.

Figure 6:
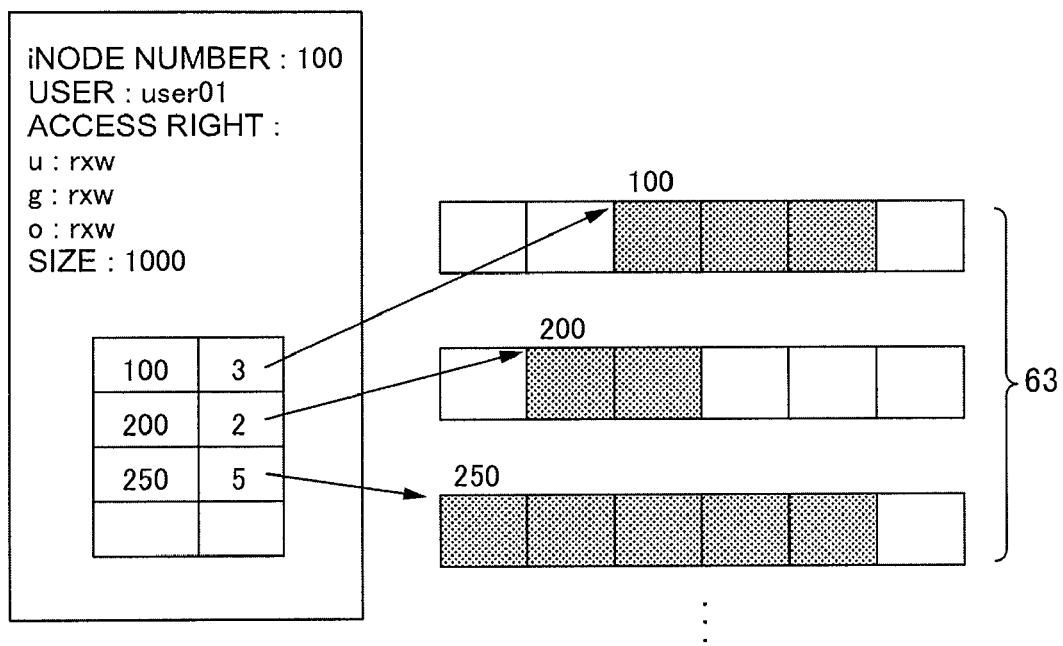
FIG. 6 is a conceptual diagram showing a reference example of a data block based on an inode.
Figure 7:
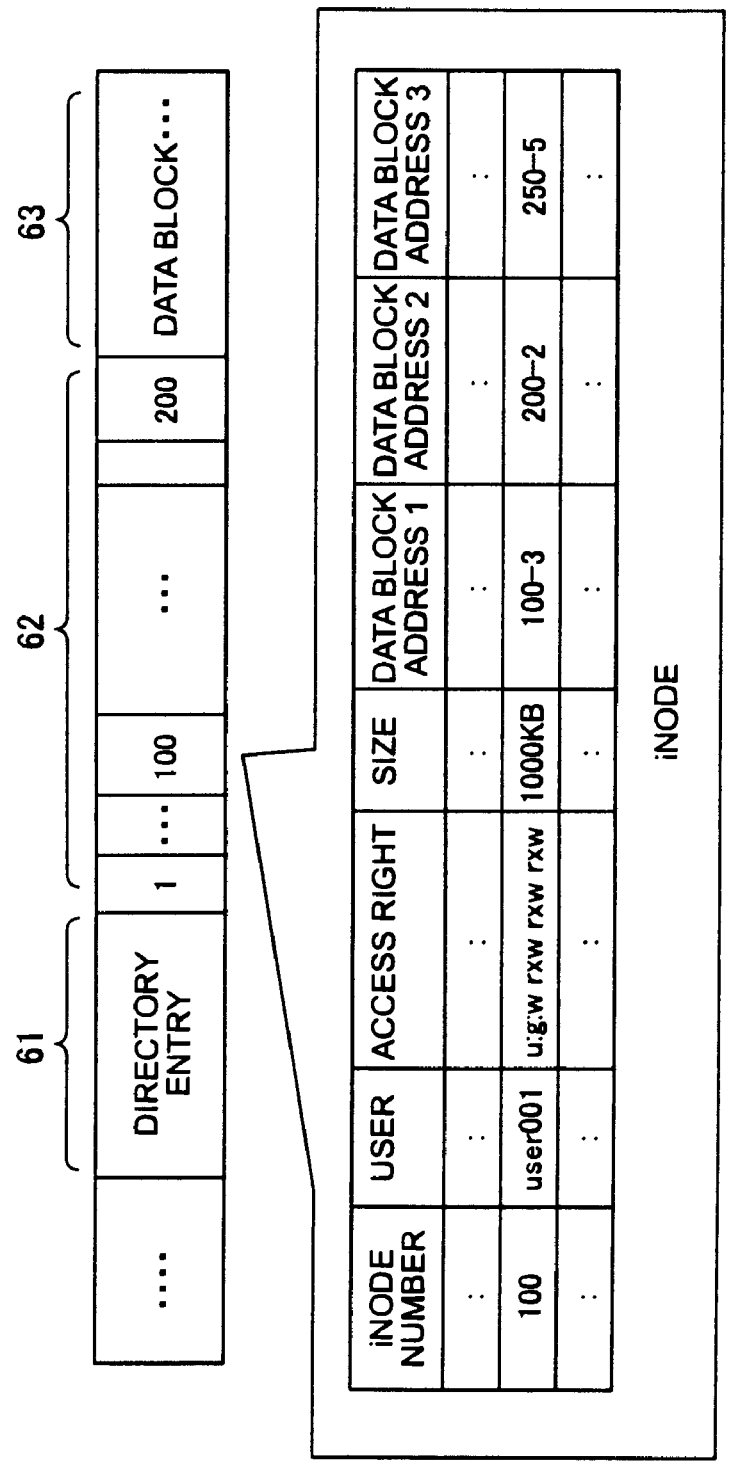
FIG. 7 is a conceptual diagram showing the relationship between an inode management table and an inode.

An inode refers to management information of the file including information such as the ownership, access right, file size and data storage location of the corresponding file. The referral relationship of the inode and the data block 63 is shown in FIG. 6. The numbers "100," "200" and "250" in the table within the frame on the left side of FIG. 6 represent the block address, and the numbers "3," "2" and "5" represent the number of blocks of the data block 63 storing the data which are successive from that block address. As shown in FIG. 7, the inode is managed by being stored in the inode management table 62.

The data block 63 refers to the logical block storing the actual file data, management data and the like.

The file sharing program 50 is a program for providing a file sharing service to the client 3 by using a communication protocol such as a CIFS (Common Internet File System) or an NFS (Network File System).

The NAS server 11 also comprises a kernel (not shown) in addition to the file sharing program 50 and the file system program 51. The kernel implements the schedule control of a plurality of programs (processes) running on the NAS server 11 and the overall control such as handling the interruption from the hardware.

Figure 8:
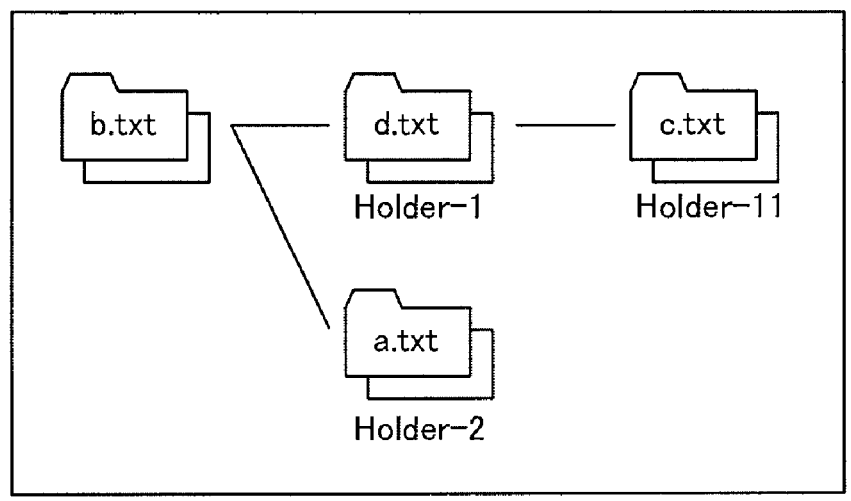
FIG. 8 is a conceptual diagram showing an example of a directory image to be provided by the GNS server to the client.

The GNS server 10 is loaded with a GNS management program 65. The GNS management program 65 is a program for providing, to the client 3, a view of the file data that is distributed and stored in a plurality of NAS servers 11 by unifying such data as a single directory image. For example, a directory image as shown in FIG. 8 is provided to the client 3.

Here, the GNS management program 65 creates, for each GNS, a GNS management table 64 as shown in FIG. 9. The GNS management table 64 is configured from a directory path name column 64A, a host name column 64B, a file system name column 64C, and an inode number column 64D.

Among the above, the directory path name column 64A stores the directory path name to each file belonging to the corresponding GNS that the GNS management program 65 provides to the client 3, and the host name column 64B stores the NAS name of the NAS server 11 that is managing that file. The file system name column 64C stores the file system name of the file system that is providing that file, and the inode column 64D stores the inode number of the inode of that file.

Figure 10:
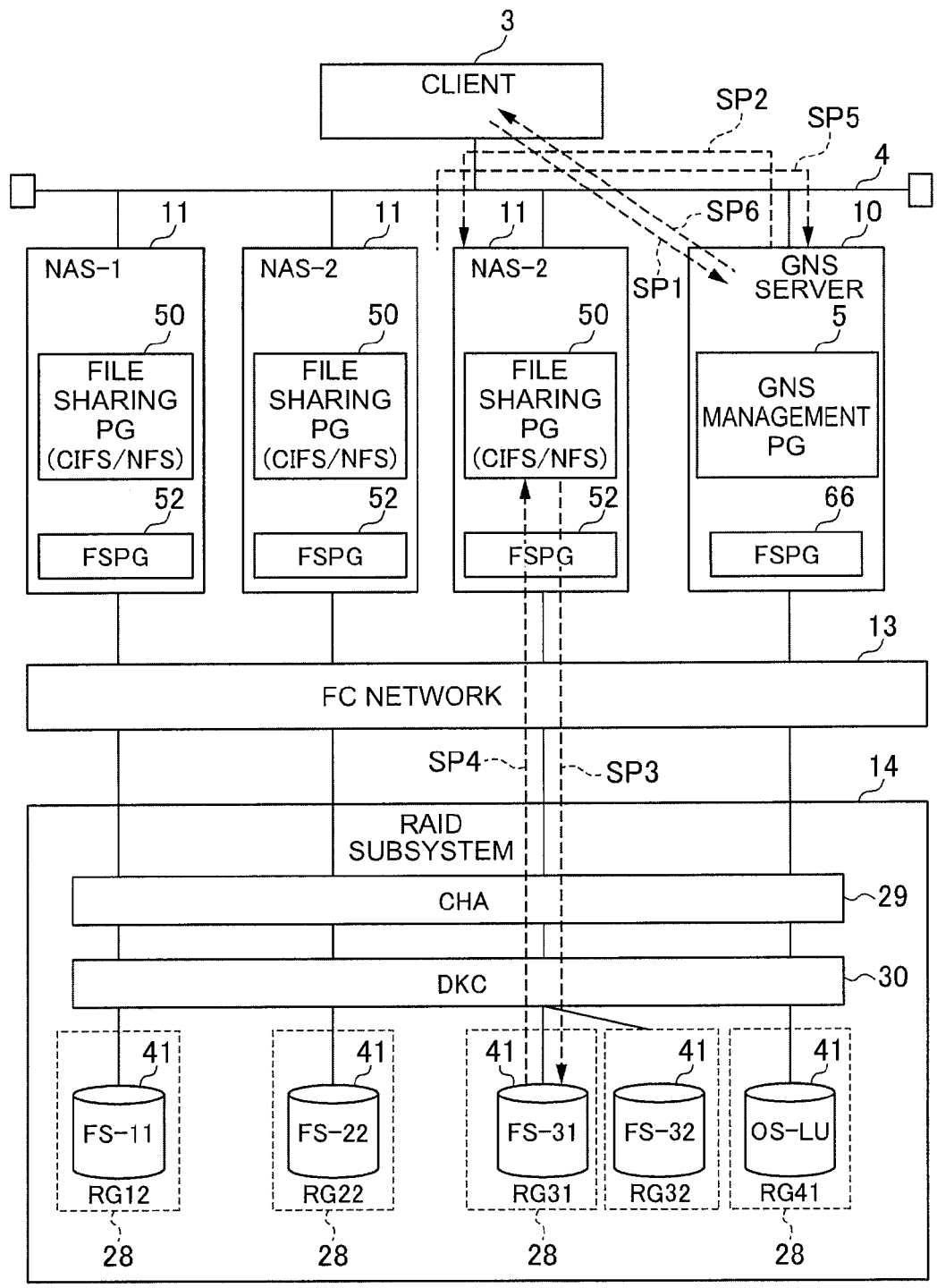
FIG. 10 is a block diagram explaining the flow of GNS processing.

If, for instance, in the example shown in FIG. 9, the GNS management program 65 receives a read request from the client 3 for reading a file having a directory path name of "/Holder-2/a.txt" (FIG. 10, SP1), as shown in FIG. 10, it uses the GNS management table 64 and converts the foregoing read request into a read request for reading a file having an inode number of "1000(a.txt)" in the file system "FS31" of the "NAS-3," and sends this read request to the "NAS-3" (SP2). The "NAS-3" reads "a.txt" from the user volume 41 according to the foregoing read request (SP3, SP4). The "a.txt" is thereafter transferred from the "NAS-3" to the client 3 via the GNS server 10 (SP5, SP6).

Although the GNS server 10 is loaded with a file system program 66 and a kernel (not shown) in addition to the GNS management program 65, since the file system program 66 and the kernel have the same functions as the NAS server 11, the explanation thereof is omitted.

Meanwhile, the management server 12 is loaded, as shown in FIG. 2, a key person monitoring program 70 and a share effect monitoring program 71. The key person monitoring program 70 is a program for monitoring the key person described later and the number of such key persons, and issuing a GNS creation request to the GNS server 10 according to the number of key persons, and the share effect monitoring program 71 is a program for deleting any GNS that is not beneficial for the users by periodically requesting the GNS server 10 to perform a GNS deletion check. Details regarding the key person monitoring program 70 and the share effect monitoring program 71 will be described later. Although not shown in FIG. 2, the management server 12 is also loaded with a kernel and a file system program.

The client 3 is also loaded with various types of application software, and data to be used by the application software is read from and written into the RAID subsystem 14 of the data center. As a means for realizing the above, the client 3 is also loaded with a file system program and a kernel.

(2) GNS Configuration Management Function and Share Effect Monitoring Function According to Present Embodiment (2-1) Outline and Configuration of Various Management Tables The GNS configuration management function and the share effect monitoring function loaded in the management server 12 are now explained.

The management server 12 of this embodiment is loaded with a GNS configuration management function of collecting the access log 81 and the like described above with reference to FIG. 3 from the respective NAS servers 11, specifies the key person for each NAS server 11 based on each of the collected access logs 81, and, if the number of key persons who are common between two NAS servers 11 exceeds a prescribed number, integrates these NAS servers 11 into a single GNS. Here, a key person refers to a user who created a certain number of files or more in the NAS server 11 and in which the total value of the number of times that other users using the same NAS server 11 have referred to the files created by that key person and the number of links from other files to the files created by that key person exceeds a certain number.

The management server 12 of this embodiment is also loaded with a share effect monitoring function for monitoring the share effect of the integrated NAS servers 11 and releasing the integration of the NAS servers 11 in which a share effect is not yielded. Here, a share effect of the NAS server 11 refers to how much the user is enjoying the sharing effect as a result of consolidating a plurality of NAS servers 11 into a single GNS. For example, if there are numerous files that cannot be accessed due to access restriction even if the sharing of the NAS servers 11 is sought with the GNS, the management server 12 determines that is no share effect based on the integration of the NAS servers 11. Contrarily, if there are numerous files without access restriction and the users who were using these NAS servers 11 are now able to access files that were inaccessible in the past or if the number of accessible files increases, the management server 12 determines that there is a share effect.

As means for realizing the foregoing GNS configuration management function and the share effect monitoring function, the memory 25 (FIG. 1) of the management server 12 stores a file information management table 82 and a key person management table 83 shown in FIG. 11 and FIG. 12, respectively.

The file information management table 82 is a table for storing the file information to be used in specifying the key person and is configured, as shown in FIG. 11, from a number column 82A, a NAS name column 82B, a user name column 82C, a directory path name column 82D, a link quantity column 82E, and a referral count column 82F.

The NAS name column 82B stores the NAS name of the NAS server 11 that is managing the corresponding file, and the user name column 82C stores the user account of the user who created that file. In FIG. 11, with regard to the two digit number that is assigned after the "user-" of the user account, the first digit represents the number of the affiliated NAS server 11, and the second digit represents the serial number. Thus, for example "user-21" shows that it is the "first" user account belonging to "NAS-2."

The directory path name column 82D stores the directory path of that file, and the link quantity column 82E stores the number of links (number of citations) from other files (documents) to that file. The referral count column 82F stores the number of times (referral count) that the user referred to such file.

The key person management table 83 is a table for managing the key person who is common among a plurality of NAS servers 11 and the number of such key persons and, as shown in FIG. 12, is formed in a so-called competitor chart format. The key person management columns 83A to 83C in the key person management table 83 respectively store the user name of each key person and the number of key persons who are common between the NAS server 11 associated with the row to which each of the key person management columns 83A to 83C belongs, and the NAS server 11 associated with the line to which each of the key person management columns 83A to 83C belongs.

For instance, in the case of the example illustrated in FIG. 12, the key person management column 83A stores the user name ("user-11") of the key person and the number of such key persons (1 person) who are common between the NAS server 11 of "NAS-1" and the NAS server 11 of "NAS-2," and the key person management column 83B stores the user name ("user-11" and "user-31") of the key persons and the number of such key persons (2 people) who are common between the NAS server 11 of "NAS-1" and the NAS server 11 of "NAS-3." The key person management column 83C stores the user name ("user-21," "user-22," "user-23," "user-31" and "user-32") of the key persons and the number of such key persons (5 people) who are common between the NAS server 11 of "NAS-2" and the NAS server 11 of "NAS-3."

(2-2) Processing of Respective Programs

The GNS configuration management processing to be executed by the key person monitoring program 70 and the share effect monitoring processing to be executed by the share effect monitoring program 71 of the management server 12 in relation to the foregoing GNS configuration management function and the share effect monitoring function are now explained.

In the ensuing explanation, let it be assumed that the GNS is not configured in the initial state. In addition, let it be assumed that the files stored in the RAID subsystem 14 are not subject to access restriction such as ACL (Access Control List), and the files that are subject to access restriction can only be accessed by a user account in which access is permitted in advance even if the NAS servers 11 are integrated with the GNS.

Moreover, although the processing subject of the various types of processing is explained as a "program" in the ensuing explanation, in reality, it goes without saying that, based on such program, the CPU 20 (FIG. 1) of the GNS server 10, the CPU 24 (FIG. 1) of the management server 12, or the CPU 22 (FIG. 1) of the corresponding NAS server 11 executes the processing.

(2-2-1) Processing of Key Person Monitoring Program

Figure 14:
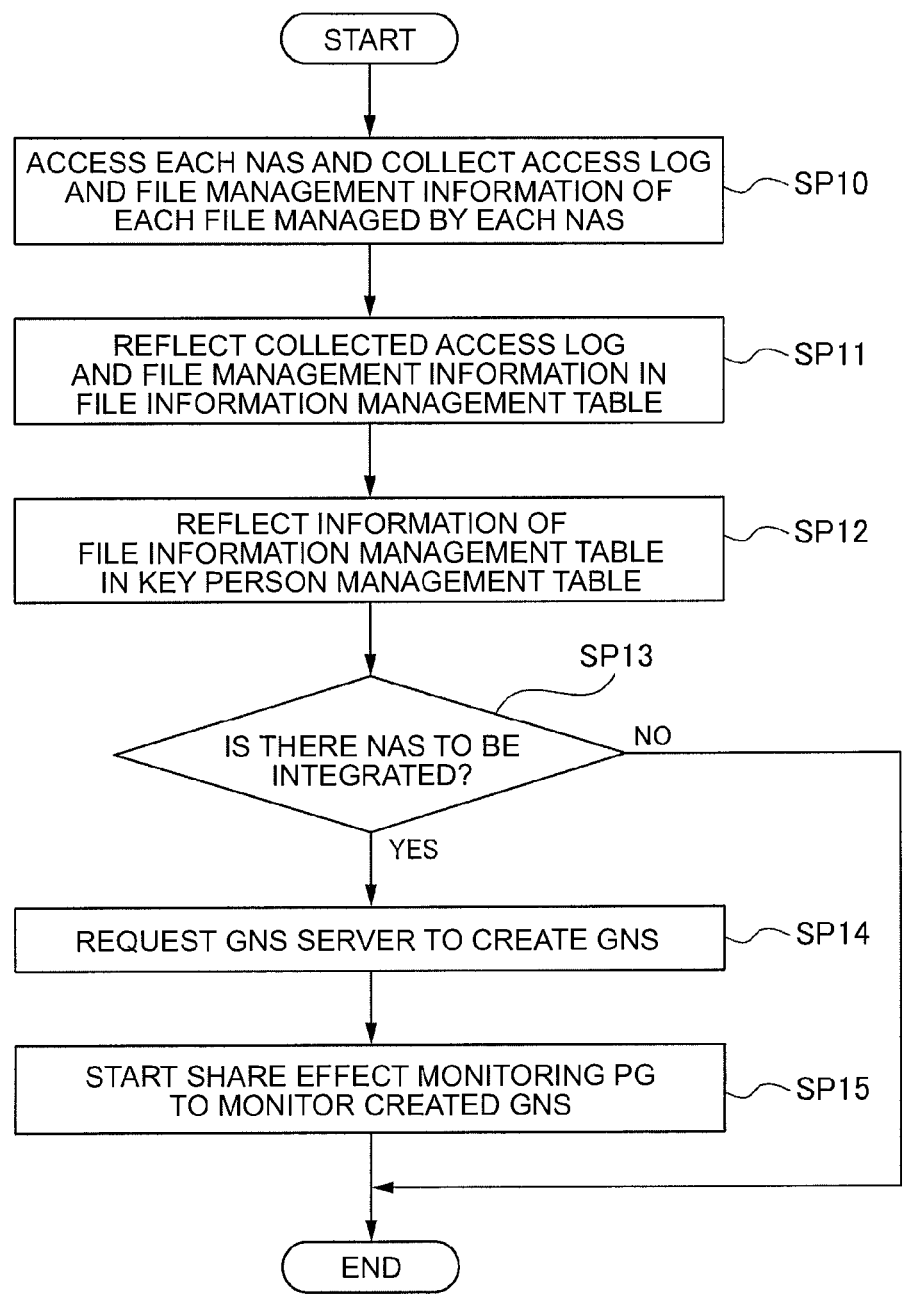
FIG. 14 is a flowchart showing the processing routine of key person monitoring processing.

FIG. 14 shows the processing routine of the GNS configuration management processing to be executed by the key person monitoring program 70 (FIG. 2) in relation to the foregoing GNS configuration management function. The key person monitoring program 70 specifies the key persons who are common among a plurality of NAS servers 11 by periodically executing this key person monitoring processing, and, based on the result of the foregoing specification, requests the GNS server 10 to integrate the plurality of NAS servers 11 into one GNS as needed.

Specifically, when the key person monitoring program 70 starts the key person monitoring processing, it foremost accesses each NAS server 11 and acquires, from that NAS server 11, information (this is hereinafter referred to as the "file management information") such as the access log 81 (FIG. 3) retained by that NAS server 11, and the directory entry 61 and the inode management table 62 explained above with reference to FIG. 4 concerning the respective files that are being managed by that NAS server 11 (SP10).

Subsequently, the key person monitoring program 70 registers, in the file information management table 82 (FIG. 11), information such as the directory path name to the respective files that are being managed by the respective NAS servers 11, name of the user who created that file, and the server name of the NAS server 11 managing that file based on the file management information of the respective files that are being managed by the respective NAS servers 11 which was collected at SP10. The key person monitoring program 70 counts the referral count of that file and the number of links from other files to that file based on the respective access logs 81 collected at SP10, and registers the count result in the file information management table 82 (SP11).

The key person monitoring program 70 refers to the file information management table 82 and extracts a key person for each NAS server 11, detects a key person who is common among a plurality of NAS servers 11 based on the extracted result, and stores the user name of the detected key person and the number of such key persons in the corresponding key person management columns 83A to 83C (FIG. 12) of the key person management table 83 (FIG. 12) (SP12).

For instance, in the example illustrated in FIG. 11, assuming that the requirements of the key person is a user who created one or more files, and the total value of the number of times that other users using the same NAS server 11 referred to files created by that key person and the number of links from other files to the files created by that key person is 20 or more, as shown in FIG. 13, the users corresponding to the colored entries in FIG. 13 are extracted as the key person of each NAS server 11, and the key person management table 83 as shown in FIG. 12 is created based on the extracted result.

Subsequently, the key person monitoring program 70 refers to the key person management table 83 determines whether there are NAS servers 11 to be integrated; that is, whether there are a plurality of NAS servers 11 in which the number of key persons who are common among a plurality of NAS servers 11 is greater than a predetermined threshold (this is hereinafter referred to as the "integration threshold") (SP13). For instance, in the example illustrated in FIG. 12, if the foregoing integration threshold is "4," since the number of key persons who are common between the NAS server 11 of "NAS-2" and the NAS server 11 of "NAS-3" in the example of FIG. 12 is greater than the integration threshold, a positive result will be obtained in the foregoing determination.

If the key person monitoring program 70 obtains a negative result in the foregoing determination, it ends this GNS configuration management processing. Meanwhile, if the key person monitoring program 70 obtains a positive result in the foregoing determination, it sends a GNS creation request to the GNS server 10 so as to integrate the NAS servers 11 in which the number of common key persons is greater than the integration threshold into the same GNS (SP14).

Further, the key person monitoring program 70 starts up the share effect monitoring program for monitoring the share effect of the foregoing integration (SP15), and thereafter ends this GNS configuration management processing.

As described above, the key person monitoring program 70 requests the GNS management program 65 of the GNS server 10 to specify the number of key persons and integrate the GNS of the plurality of NAS servers 11 in which the number of key persons is greater than a prescribed number, and thereby integrates the NGS of the plurality of NAS servers 11.

(2-2-2) Processing of Share Effect Monitoring Program

Figure 15:
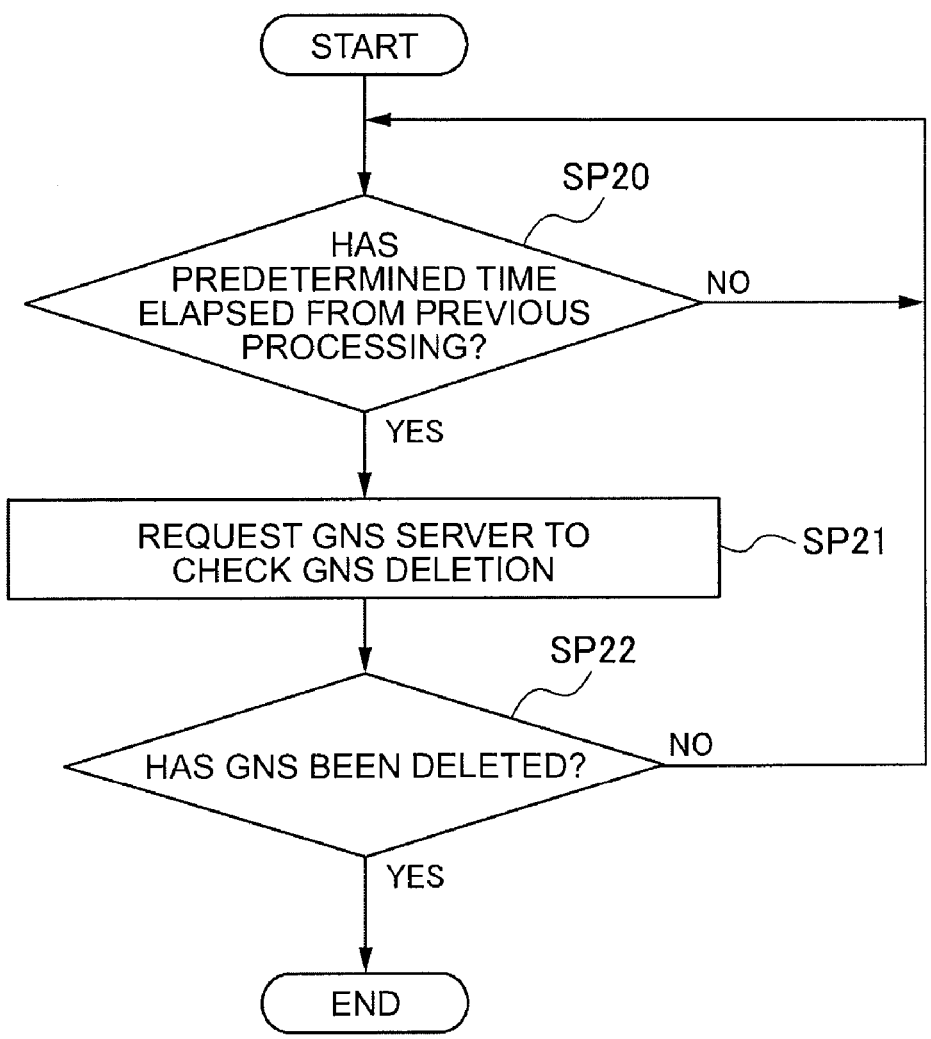
FIG. 15 is a flowchart showing the processing routine of share effect monitoring processing.

Meanwhile, FIG. 15 shows the processing routine of the share effect monitoring processing to be executed by the share effect monitoring program 71 in relation to the foregoing share effect monitoring function. When the share effect monitoring program 71 is started up by the key person monitoring program 70, it executes the share effect monitoring processing and requests the GNS server 10 to delete the GNS with no share effect.

Specifically, when the share effect monitoring program 71 is started up by the key person monitoring program 70, it starts this share effect monitoring processing, and foremost waits for a prescribed period of time to elapse from the time it last issued the GNS deletion check request described later (SP20).

When a prescribed period of time eventually elapses from the time that the GNS deletion check request was last issued, the share effect monitoring program 71 issues a GNS deletion check request to the GNS server 10 (SP21). Consequently, the GNS server 10 determines, as described later, whether there is no share effect of the NAS server 11 regarding the GNS that was created immediately before the share effect monitoring program 71 is started up according to the GNS deletion check request, and deletes that GNS if there is no share effect.

The share effect monitoring program 71 thereafter determines whether the GNS targeted at such time was deleted according to the GNS deletion check request (SP22). If the share effect monitoring program 71 obtains a negative result in the foregoing determination, it returns to step SP20, and thereafter similarly repeats step SP20 to step SP22. Meanwhile, if the share effect monitoring program 71 obtains a positive result in the determination at step SP22, it ends this share effect monitoring processing.

As described above, the share effect monitoring program 71 periodically requests the GNS server 10 to check whether to delete the GNS management table 64, and thereby monitors the share effect of the GNS until the GNS management table 64 is deleted.

(2-2-3) Processing of GNS Management Program

Figure 16:
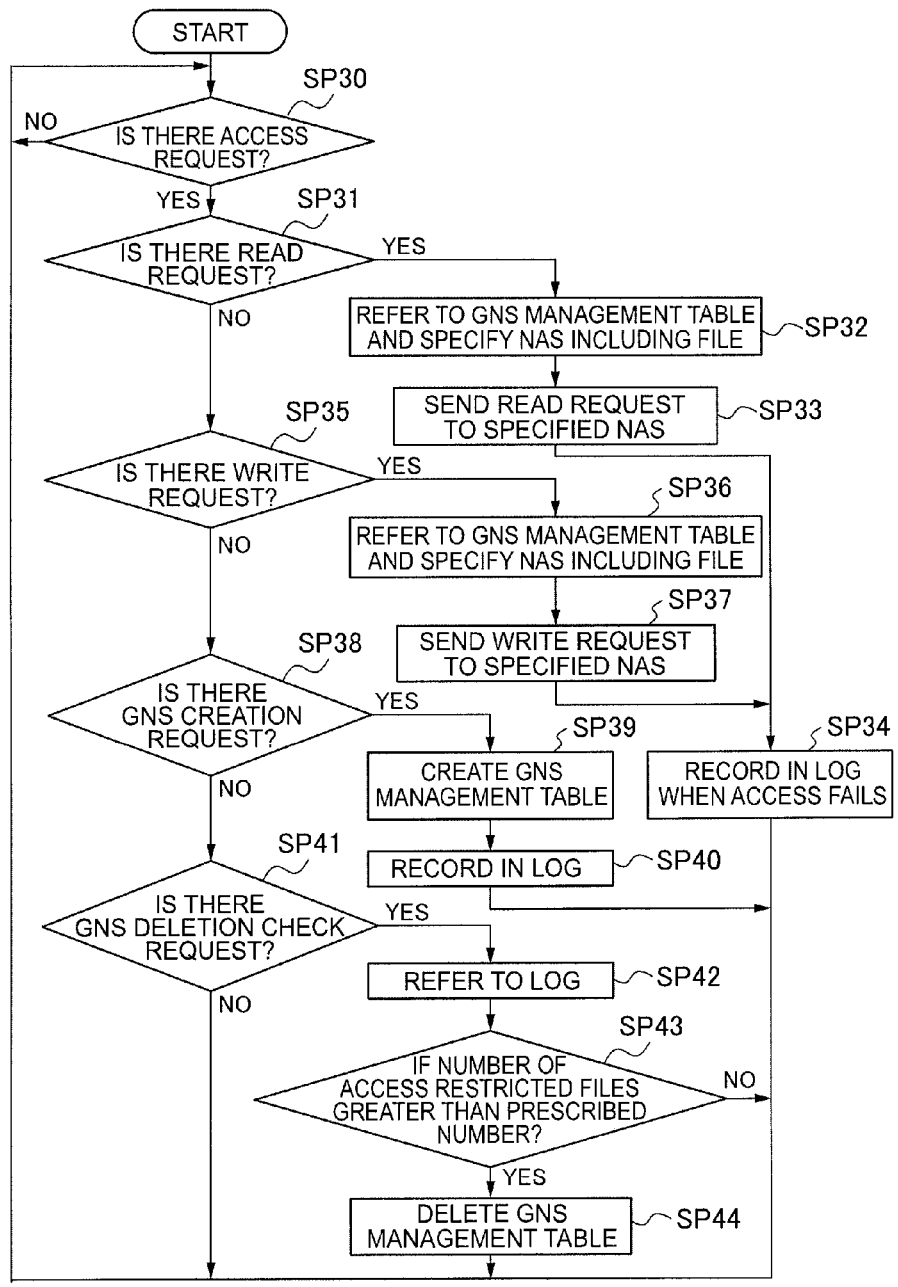
FIG. 16 is a flowchart showing the processing routine of GNS management processing.

Meanwhile, FIG. 16 shows the processing routine of the GNS management processing to be executed by the GNS management program 65 loaded in the GNS server 10. The GNS management program 65 executes processing according to the various requests issued from the client 3 and the management server 12 according to the GNS management processing routine shown in FIG. 16.

Specifically, the GNS management program 65 starts the GNS management processing after it is started up, and foremost waits until some kind of access request is issued from the client 3 or the management server 12 (SP30).

When the GNS management program 65 receives some kind of access request from the client 3 or the management server 12, it determines whether that access request is a read request from the client 3 (SP31).

If the GNS management program 65 obtains a positive result in the foregoing determination, it refers to the GNS management table 64 and specifies the NAS server 11 that is managing the read-target file that is designated in that read request (SP32), and sends a read request according to that read request to the specified NAS server 11 (SP33).

If the GNS management program 65 fails in the reading of the file data at step SP33 due to, for instance, access restriction or other reasons, it records the current date and time, the file name of the file that could not be accessed, and the operation (read/write) as an access fail log (SP34), and thereafter returns to SP30.

Meanwhile, if the GNS management program 65 obtains a negative result in the determination at step SP31, it determines whether the received access request is a write request from the client 3 (SP35).

If the GNS management program 65 obtains a positive result in the foregoing determination, it refers to the GNS management table 64 and specifies the NAS server 11 which should manage the write-target file that is designated in the write request (SP36), and sends the write request and the data of the write-target file according to that write request to the specified NAS server 11 (SP37).

If the GNS management program 65 fails in the writing of the file data at step SP33 due to, for instance, access restriction or other reasons, it records the current date and time, the file name of the file that could not be accessed, and the operation (read/write) as an access fail log (SP34), and thereafter returns to SP30.

Meanwhile, if the GNS management program 65 obtains a negative result in the determination at step SP35, it determines whether the received access request is a GNS creation request from the management server 12 (SP38).

If the GNS management program 65 obtains a positive result in the foregoing determination, it creates a new GNS in which a plurality of NAS servers 11 are integrated therein by created a GNS management table 64 regarding the plurality of NAS servers 11 that were designated in the GNS creation request (SP39), records the fact that a new GNS was created and the created date and time in the log (SP40), and thereafter returns to SP30.

Meanwhile, if the GNS management program 65 obtains a negative result in the determination at step SP38, it determines whether the received access request is a GNS deletion check request from the management server 12 (SP41).

If the GNS management program 65 obtains a positive result in the foregoing determination, it verifies the access fail log (SP42), and determines whether the number of access restricted files is greater than a prescribed number (SP43).

If the GNS management program 65 obtains a positive result in the foregoing determination, it deletes the GNS management table 64 (SP44), notifies the management server 12 that the GNS management table 64 has been deleted, and thereafter returns to SP30.

Meanwhile, if the GNS management program 65 obtains a negative result in the determination at step SP43, it returns to SP30.

As described above, according to the GNS management program 65, it is possible to access the NAS server 11 based on the GNS management table 64, create a GNS when the management server 12 requests the creation of a GNS, and delete the GNS management table 64 based on the number of files that could not be accessed when the management server 12 issues a GNS deletion check.

(3) Effect of Present Embodiment

With the computer system 1 according to this embodiment, it is possible to specify a key person for each NAS server 11, and, if the number of key persons who are common between two NAS servers 11 is greater than a prescribed number, these NAS servers 11 are integrated into the same GNS. Accordingly, with this computer system 1, the administrator is not required to determine which NAS servers 11 should be integrated into the same GNS, and it is thereby possible to simplify the management of the GNS and alleviate the burden of the administrator.

Moreover, according to this computer system 1, even after a plurality of NAS servers 11 are integrated into one GNS, the effect of such integration is periodically evaluated and a GNS with a low effect is eliminated. Thus, it is possible to further simplify the management of the GNS and alleviate the burden of the administrator.

(4) Other Embodiments

Although the foregoing embodiment explained a case of providing three GNS servers 10 and a plurality of NAS servers 11 in the computer system 1, the present invention is not limited thereto, and the present invention can also be applied even if the number of GNS servers 10 and the number of NAS servers 11 to be provided are other than the above.

Moreover, although the foregoing embodiment explained a case of configuring the management server 12 and the GNS server 10 as separate apparatuses, the present invention is not limited thereto, and the management server 12 and the GNS server 10 may also be configured as a single server.

Furthermore, although the foregoing embodiment explained a case where the key person was defined as a user who created a certain number of files or more in the NAS server 11 and in which the total value of the number of times that other users using the same NAS server 11 have referred to the files created by that key person and the number of links from other files to the files created by that key person exceeds a certain number, the present invention is not limited thereto, and various other types of definitions may be broadly applied as the definition of the key person.

The present invention can be broadly applied to computer system comprising a plurality of NAS servers.

What is claimed is:

1. A computer system, comprising:
a storage subsystem configured to provide a storage area for reading and writing files;
a plurality of nodes configured to provide a file sharing service to at least one user;
a server configured to unify the plurality of nodes and to provide this as a single name space to a client; and
a management apparatus comprising one or more computers for managing each of the nodes and the server,
wherein the management apparatus:
collects, from each of the nodes, management information and an access log of each of the files managed by the relevant node,
extracts a user who satisfies a prescribed condition as a key person for each of the nodes based at least in part on the collected management information and access log of each of the files, and specifies the key person who is common to the plurality of nodes among the extracted key persons, wherein the prescribed condition comprises that (i) the key person is a user who created at least one file in the server and (ii) a total number of times that other users using the server refer to the at least one file created by the key person and a number of links from other files to the at least one file created by the key person exceeds a predetermined number, and
requests the server to integrate, as a single name space, the plurality of nodes in which the number of common key persons exceeds a predetermined first threshold,
wherein the server integrates, as a single name space, the plurality of nodes in which the number of common key persons exceeds a predetermined first threshold in response to the request,
wherein the server determines a share effect of the integration for each of the single name spaces, and releases the integration which does not yield any share effect,
wherein the file is able to set an access restriction, and
wherein the server determines a share effect of the integration based on the number of times that access to the file managed by one node among the plurality of nodes that were integrated as a single name space ended in failure due to the access restriction.

2. The computer system according to claim 1,
wherein the management apparatus:
detects a referral count of a file for each user who created that file and number of links to the file from another file based on the management information and the access log of each of the files, and
extracts the key person for each of the nodes based on the detected referral count and number of links to the file.

3. The computer system according to claim 2,
wherein the management computer extracts, for each of the nodes, the user in which a total value of the referral count and the number of links to the file exceeds a predetermined second threshold as the key person.

4. A method of managing a single name space in a computer system,
wherein the computer system comprises:
a storage subsystem configured to provide a storage area for reading and writing files;
a plurality of nodes configured to provide a file sharing service to at least one user;
a server configured to unify the plurality of nodes and to provide this as a single name space to a client; and
a management apparatus configured to manage each of the nodes and the server,
the method comprising:
a first step of the management apparatus collecting, from each of the nodes, management information and an access log of each of the files managed by the relevant node, extracting a user who satisfies a prescribed condition as a key person for each of the nodes based at least on the collected management information and access log of each of the files, specifying the key person who is common to the plurality of nodes among the extracted key persons, and requesting the server to integrate, as a single name space, the plurality of nodes in which the number of common key persons exceeds a predetermined first threshold, wherein the prescribed condition comprises that (i) the key person is a user who created at least one file in the server and (ii) a total number of times that other users using the server refer to the at least one file created by the key person and a number of links from other files to the at least one file created by the key person exceeds a predetermined number; and
a second step of the server integrating, as a single name space, the plurality of nodes in which the number of common key persons exceeds a predetermined first threshold in response to the request,
wherein the server determines a share effect of the integration for each of the single name spaces, and releases the integration which does not yield any share effect,
wherein the file is able to set an access restriction, and
wherein the server determines a share effect of the integration based on the number of times that access to the file managed by one node among the plurality of nodes that were integrated as a single name space ended in failure due to the access restriction.

5. The method of managing a single name space according to claim 4, wherein, at the first step, the management apparatus:

detects a referral count of a file for each user who created that file and number of links to the file from another file based on the management information and the access log of each of the files, and extracts the key person for each of the nodes based on the detected referral count and number of links to the file.

6. The method of managing a single name space according to claim 5, wherein, at the first step, the management apparatus extracts, for each of the nodes, the user in which a total value of the referral count and the number of links to the file exceeds a predetermined second threshold as the key person.

* * * * *